(12) United States Patent
Chen (10) Patent No.: US 7,657,115 B2
(45) Date of Patent: Feb. 2, 2010

(54) IMAGE EDGE ENHANCEMENT APPARATUS AND METHOD THEREOF

(75) Inventor: Te-Yi Chen, Hualien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 786 days.

(21) Appl. No.: 11/450,454

(22) Filed: Jun. 12, 2006

(65) Prior Publication Data

US 2007/0065036 A1    Mar. 22, 2007

(30) Foreign Application Priority Data

Sep. 21, 2005    (TW) .............................. 94132726 A (51) Int. Cl.
*G06K 9/40* (2006.01)

(52) U.S. Cl. ...................... 382/266; 382/260; 382/274; 382/275; 358/3.26; 358/3.27; 358/463

(58) Field of Classification Search ................ 382/260, 382/266, 269, 274, 275; 358/3.26, 3.27, 358/463
See application file for complete search history.

(56) References Cited

U.S. PATENT DOCUMENTS 5,070,754 A * 12/1991 Adamson ..................... 84/454
5,541,668 A * 7/1996 Kuwahara et al. ........... 348/624
5,720,928 A * 2/1998 Schwartz ..................... 422/186
6,294,136 B1 * 9/2001 Schwartz ..................... 422/186
6,400,921 B1 * 6/2002 Leclerc et al. ............... 399/266

FOREIGN PATENT DOCUMENTS

| CN | 1422069 A | 6/2003 |
|---|---|---|
| CN | 1522069 A | 6/2003 |

* cited by examiner

*Primary Examiner*—Yosef Kassa
(74) *Attorney, Agent, or Firm*—Rabin & Berdo, P.C.

(57) ABSTRACT

An image edge enhancement apparatus and a method thereof used for adjusting the brightness of a pixel are provided. The image edge enhancement apparatus comprises a first edge judgment circuit, a second edge judgment circuit and a process circuit. The first edge judgment circuit retrieves the edge data of the pixel in a first direction to output a first edge value. The second edge judgment circuit retrieves the edge data of the pixel in a second direction to output a second edge value. The process circuit determines an operation mode according to the brightness of a plurality of adjacent pixels around the pixel, the first edge value and the second edge value to output an adjusted brightness of the pixel according to operation mode. The adjusting method effectively avoids the noise in an image being amplified, and avoids the same edge being repetitively enhanced by different edge judgment circuits.

28 Claims, 6 Drawing Sheets

| $p_{i-1, j+1}$ | $p_{i, j+1}$ | $p_{i+1, j+1}$ |
|---|---|---|
| $p_{i-1, j}$ | $p_{i, j}$ | $p_{i+1, j}$ |
| $p_{i-1, j-1}$ | $p_{i, j-1}$ | $p_{i+1, j-1}$ |

| $p_{i-1, j+1}$ | $p_{i, j+1}$ | $p_{i+1, j+1}$ |
|---|---|---|
| $p_{i-1, j}$ | $p_{i, j}$ | $p_{i+1, j}$ |
| $p_{i-1, j-1}$ | $p_{i, j-1}$ | $p_{i+1, j-1}$ |

IMAGE EDGE ENHANCEMENT APPARATUS AND METHOD THEREOF

This application claims the benefit of Taiwan application Serial No. 94132726, filed Sep. 21, 2005, the subject matter of which is incorporated herein by reference.

BACKGROUND OF THE INVENTION

1. Field of the Invention

The invention relates in general to an image processing apparatus and a method thereof, and more particularly to an image edge enhancement apparatus and a method thereof.

2. Description of the Related Art

Figure 1:
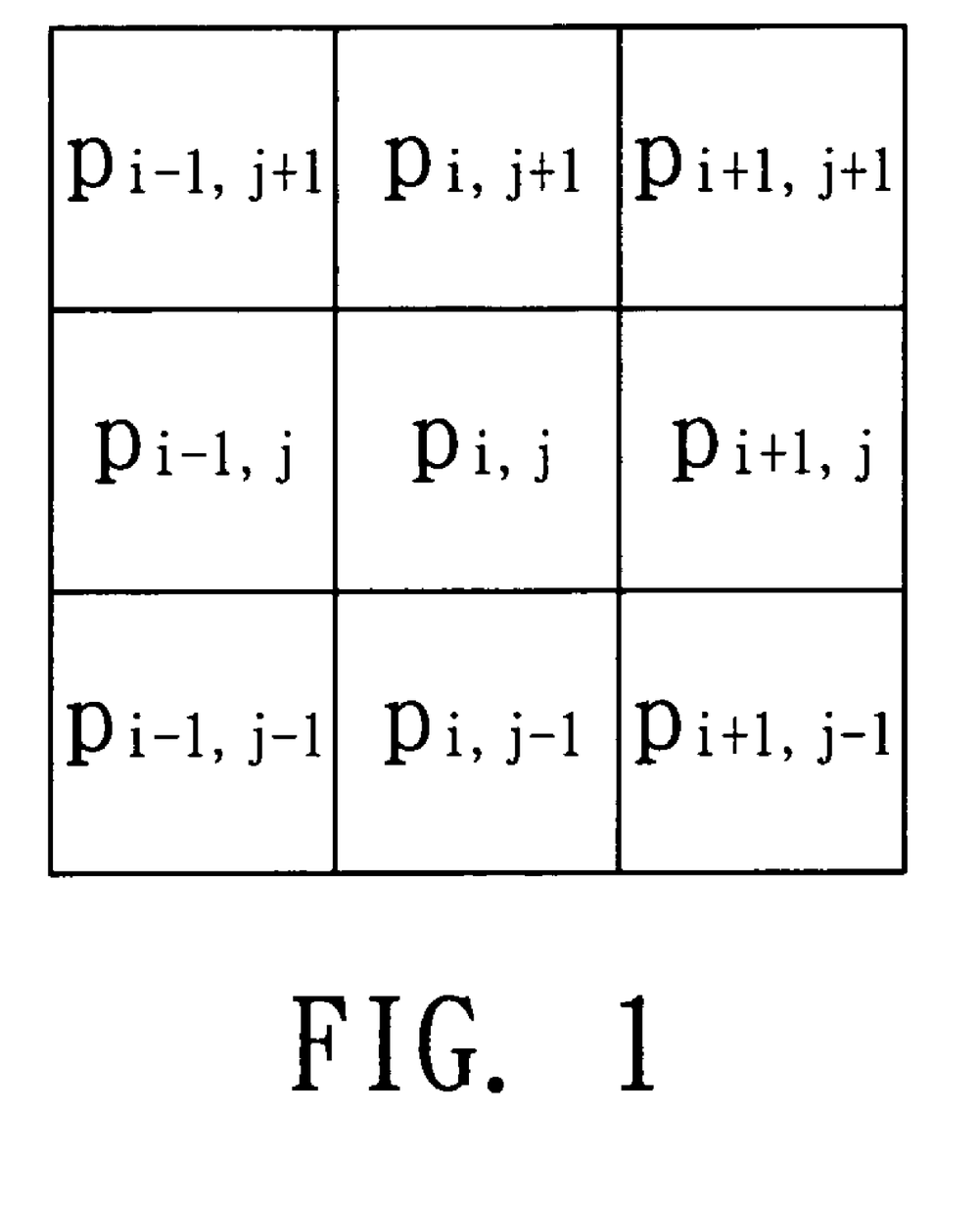
FIG. 1 illustrates a pixel and its adjacent pixels.

By adjusting the contrast or brightness of the edge of an object in a display frame, the edge enhancement technology produces a clear outline of an image and makes the object more highlighted and the frame more clearly manifested. Referring to FIG. 1, a pixel and its adjacent pixels are shown. During edge enhancement, whether a pixel $p_{i,j}$ is at an edge of an object is determined, and the brightness of the pixel is adjusted. If the pixel $p_{i,j}$ is at the edge of an object, then the contrast of the pixel is enabled to be higher than its adjacent pixels $p_{i-1,j+1}$, $p_{i,j+1}$, $p_{i+1,j+1}$, $p_{i-1,j}$, $p_{i+1,j}$, $p_{i-1,j-1}$, $p_{i,j-1}$ and $p_{i+1,j-1}$.

Figure 2:
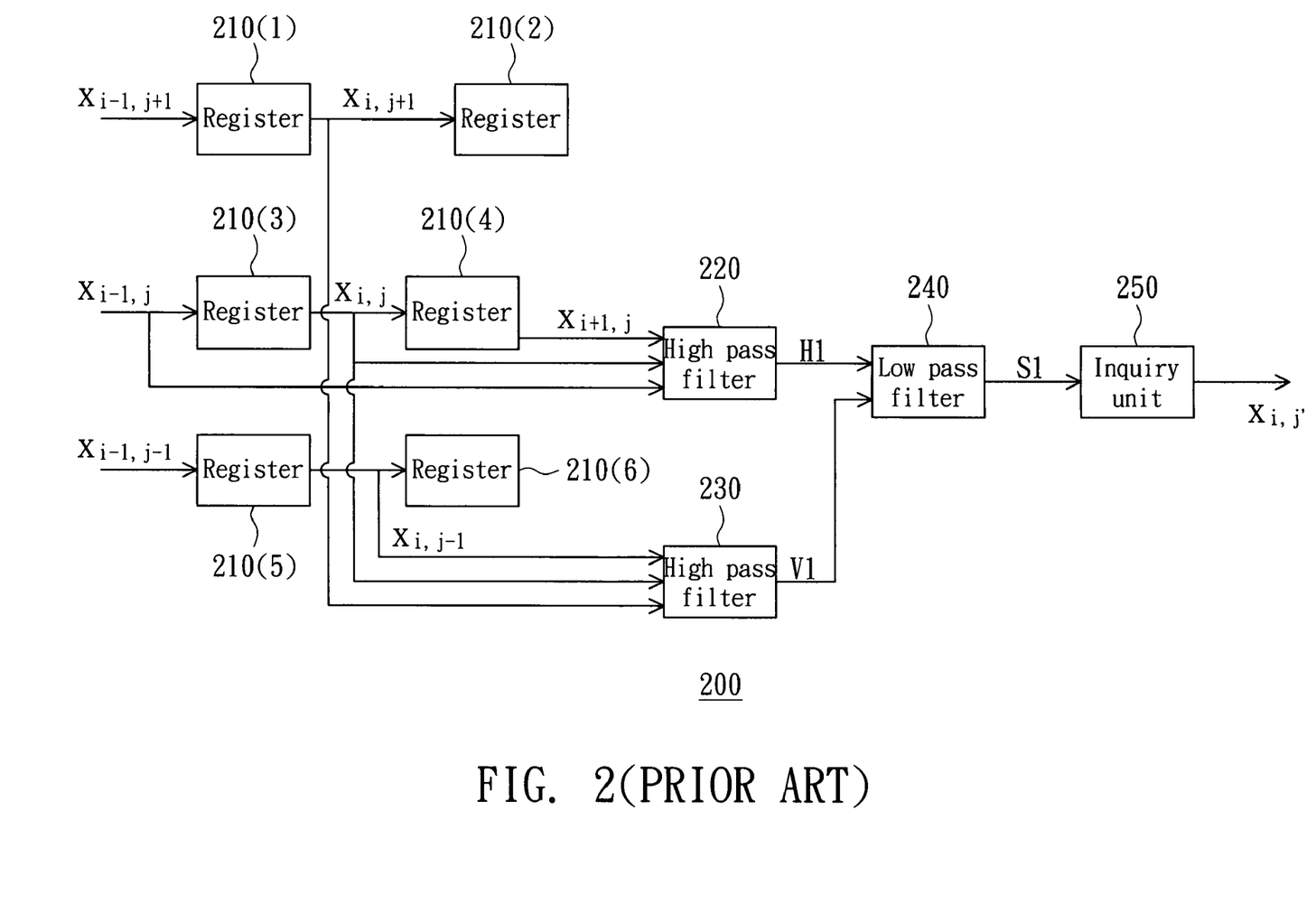
FIG. 2 illustrates a structural diagram of a conventional edge enhancement circuit.

Referring to FIG. 2, a structural diagram of a conventional edge enhancement circuit is shown. The edge enhancement circuit 200 comprises six registers 210(1)~(6), a high pass filter 220, a high pass filter 230, a low pass filter 240 and an inquiry unit 250.

The register 210(1) is used for temporarily storing the pixel value $x_{i,j+1}$. The register 210(2) is used for temporarily storing the pixel value $x_{i+1,j+1}$. The register 210(3) is used for temporarily storing the pixel value $x_{i,j}$. The register 210(4) is used for temporarily storing the pixel value $x_{i+1,j}$. The register 210(5) is used for temporarily storing the pixel value $x_{i,j-1}$. The register 210(6) is used for temporarily storing the pixel value $x_{i+1,j-1}$. The pixel values $x_{i,j+1}$, $x_{i+1,j+1}$, $x_{i,j}$, $x_{i+1,j}$, $x_{i,j-1}$ and $x_{i+1,j-1}$ are respectively the values of the pixels $p_{i,j+1}$, $p_{i+1,j+1}$, $p_{i,j}$, $p_{i+1,j}$, $p_{i,j-1}$ and $p_{i+1,j-1}$ at the predetermined color gamut.

The high pass filter 220 receives the pixel values $x_{i-1,j}$, $x_{i,j}$ and $x_{i+1,j}$ to output a horizontal edge value H1. The high pass filter 230 receives the pixel values $x_{i,j-1}$, $x_{i,j}$ and $x_{i,j+1}$, to output a vertical edge value V1. The low pass filter 240 receives a vertical edge value V1 and a horizontal edge value H1, and then outputs a processed value S1. After the inquiry unit 250 receives the processed value S1, an enhanced pixel value $x_{i,j}'$ of the pixel value $x_{i,j}$ is looked up form the look-up table to be outputted.

According to the above structure, if the pixel $p_{i,j}$ happens to be at a vertical or horizontal edge of an object, then the pixel $p_{i,j}$ will be regarded by the high pass filter 220 and the high pass filter 230 as a pixel at an edge twice. Consequently, the brightness and the contrast of the pixel $p_{i,j}$ opposite to the adjacent pixels are over-enhanced. If the pixel $p_{i,j}$ is a noise, the above structure may be misjudged, causing spots to occur at non-edge parts of the object in the frame and making the frame looked speckled.

SUMMARY OF THE INVENTION

It is therefore an object of the invention to provide an image edge enhancement apparatus and a method thereof capable of avoiding over-enhancing an object edge when the edge is determined by mistake.

The invention achieves the above-identified object by providing an image edge enhancement apparatus used for adjusting the brightness of a pixel. The image edge enhancement apparatus comprises a first edge judgment circuit, a second edge judgment circuit and a process circuit. The first edge judgment circuit retrieves the edge data of the pixel in a first direction to output a first edge value. The second edge judgment circuit retrieves the edge data of the pixel in a second direction to output a second edge value. The process circuit determines an operation mode of the pixel according to the brightness of a plurality of adjacent pixels around the pixel, the first edge value and the second edge value to output an adjusted brightness of the pixel according to the operation mode.

The invention further achieves the above-identified object by providing an image edge enhancement method. At first, the edge data of the pixel is retrieved in a first direction to output a first edge value. Next, the edge data of the pixel is retrieved in a second direction to output a second edge value. Afterwards, an operation mode is determined according to the brightness of a plurality of adjacent pixels around the pixel, the first edge value and the second edge value. At last, an adjusted brightness of the pixel is outputted according to the operation mode.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 3:
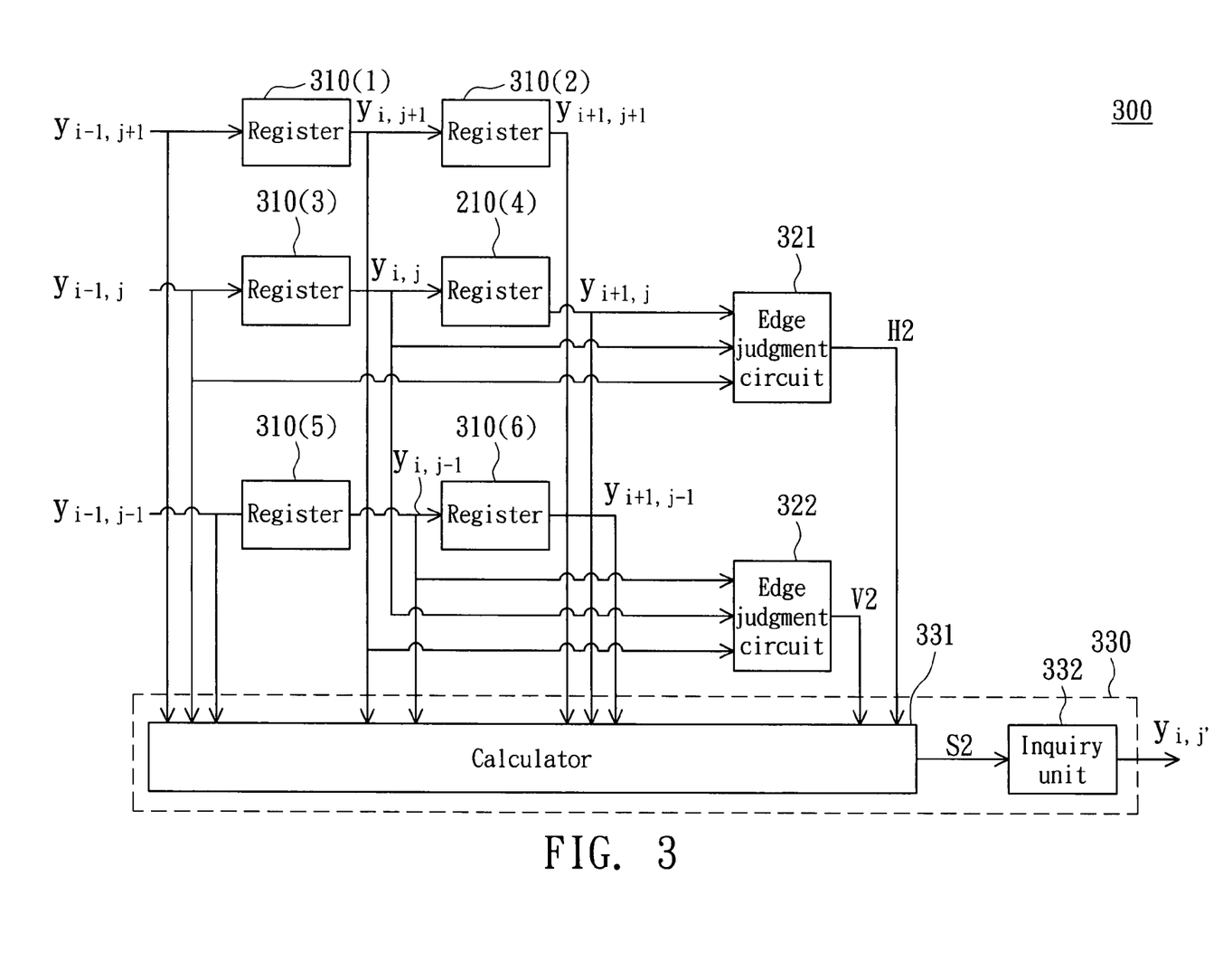
FIG. 3 illustrates a structural diagram of an image edge enhancement apparatus according to a preferred embodiment of the invention.

Referring to FIG. 3, a structural diagram of an image edge enhancement apparatus according to a preferred embodiment of the invention is shown. The image edge enhancement apparatus 300 is used for adjusting the brightness of a pixel, and is exemplified by a pixel $p_{i,j}$ in the present embodiment of the invention. The image edge enhancement apparatus 300 comprises six registers 310(1)~(6), an edge judgment circuit 321, an edge judgment circuit 322 and a process circuit 330.

Referring to FIG. 1. The treatment of image edge enhancement is applied to the pixel $p_{i,j}$. The pixel $p_{i,j}$ is surrounded by eight adjacent pixels $p_{i-1,j+1}$, $p_{i,j+1}$, $p_{i+1,j+1}$, $p_{i-1,j}$, $p_{i+1,j}$, $p_{i-1,j-1}$, $p_{i,j-1}$, $p_{i+1,j-1}$. Of the adjacent pixels, the boundary pixels $p_{i,j+1}$, $p_{i-1,j}$, $p_{i,j-1}$, $p_{i+1,j}$ are closest to the pixel $p_{i,j}$, while the other adjacent pixels are threshold pixels such as $p_{i-1,j+1}$, $p_{i+1,j+1}$, $p_{i-1,j-1}$, $p_{i+1,j-1}$.

The registers 310(1)~(6) are used for temporarily storing the brightness of the pixel $p_{i,j}$ and a plurality of adjacent pixels such as the brightness of the pixel $p_{i,j}$ and five adjacent pixels. Referring to both FIG. 1 and FIG. 3. The register 310(1) is used for temporarily storing the pixel value $y_{i,j+1}$. The register 310(2) is used for temporarily storing the pixel value $y_{i+1,j+1}$. The register 310(3) is used for temporarily storing the pixel value $y_{i,j}$. The register 310(4) is used for temporarily storing the pixel value $y_{i+1,j}$. The register 310(5) is used for temporarily storing the pixel value $y_{i,j-1}$. The register 310(6) is used for temporarily storing the pixel value $y_{i+1,j-1}$. The pixel values $y_{i-1,j+1}$, $y_{i,j+1}$, $y_{i+1,j+1}$, $y_{i-1,j}$, $y_{i,j}$, $y_{i+1,j}$, $y_{i-1,j-1}$, $y_{i,j-1}$ and $y_{i+1,j-1}$ are respectively the values of the pixels $p_{i-1,j+1}$, $p_{i,j+1}$, $p_{i+1,j+1}$, $p_{i-1,j}$, $p_{i,j}$, $p_{i+1,j}$, $p_{i-1,j-1}$, $p_{i,j-1}$ and $p_{i+1,j-1}$ in a predetermined color gamut. The predetermined color gamut is Y color gamut in the present embodiment of the invention.

The edge judgment circuit 321 receives the pixel values $y_{i-1,j}$, $y_{i,j}$, $y_{i+1,j}$, and retrieves the edge data of the pixel $p_{i,j}$ in a first direction to output a first edge value H2. The first direction can be a horizontal direction for instance. The edge judgment circuit 322 receives the pixel value $y_{i,j-1}$, $y_{i,j}$, $y_{i,j+1}$, and retrieves the edge data of the pixel $p_{i,j}$ in a second direction to output a second edge value V2. The second direction can be a vertical direction for instance. Examples of the edge judgment circuit 321 and the edge judgment circuit 322 include a high-pass finite impulse response filter (HP FIR filter).

The process circuit 330 determines the operation mode of the pixel $p_{i,j}$ to output an adjusted brightness $y_{i,j}'$ of the pixel $p_{i,j}$ according to the brightness of the adjacent pixels around the pixel $p_{i,j}$, that is, namely, $y_{i-1,j+1}$, $y_{i,j+1}$, $y_{i+1,j+1}$, $y_{i-1,j}$, $y_{i+1,j}$, $y_{i-1,j-1}$, $y_{i,j-1}$ and $y_{i+1,j-1}$, and a first edge value H2 and a second edge value V2. The process circuit 330 comprises a calculation unit 331 and an inquiry unit 332. The calculation unit 331 determines the edge type of the pixel $p_{i,j}$ according to the brightness of the adjacent pixels around the pixel $p_{i,j}$, and then obtains an operation mode according to whether the first edge value H2 and the second edge value V2 are positive and the edge type of the pixel $p_{i,j}$. The calculation unit 331 generates a pixel calculation value S2 according to the operation mode of the pixel $p_{i,j}$. The inquiry unit 332 generates an adjusted brightness $y_{i,j}'$ of the pixel $p_{i,j}$ from a predetermined look-up table according to the pixel calculation value S2.

As for how the calculation unit 331 determines the operation mode of the pixel $p_{i,j}$ is disclosed below. The calculation unit 331, first of all, sets four calculation values $y_{i,j+1}'$, $y_{i-1,j}'$, $y_{i,j-1}'$ and $y_{i+1,j}'$ to determine the brightness relationship between the pixel $p_{i,j}$ and the four adjacent boundary pixels.

The boundary pixel calculation values $y_{i,j+1}'$, $y_{i-1,j}'$, $y_{i,j-1}'$ and $y_{i+1,j}'$ of the pixel $p_{i,j}$ are disclosed below:

$$y_{i,j+1}'=y_{i,j+1}-(y_{i-1,j+1}+y_{i+1,j+1})/2;$$

$$y_{i-1,j}'=y_{i-1,j}-(y_{i-1,j+1}+y_{i-1,j-1})/2;$$

$$y_{i,j-1}'=y_{i,j-1}-(y_{i-1,j-1}+y_{i+1,j-1})/2;$$

$$y_{i+1,j}'=y_{i+1,j}-(y_{i+1,j-1}+y_{i+1,j+1})/2;$$

And then, whether the corresponding criteria C1, C2, C3 and C4 are 0 or 1 is determined according to the relationship between the calculation values $y_{i,j+1}'$, $y_{i-1,j}'$, $y_{i,j-1}'$ and $y_{i+1,j}'$ and a predetermined threshold value Th. The threshold value Th is determined by the user of the image edge enhancement apparatus. The Th value affects how largely the noise is restricted. If $y_{i,j+1}'<Th$, then C1=1. If $y_{i,j+1}'>Th$, then C1=0. The values of the criteria C2, C3 and C4 are obtained likewise.

Figure 4A:
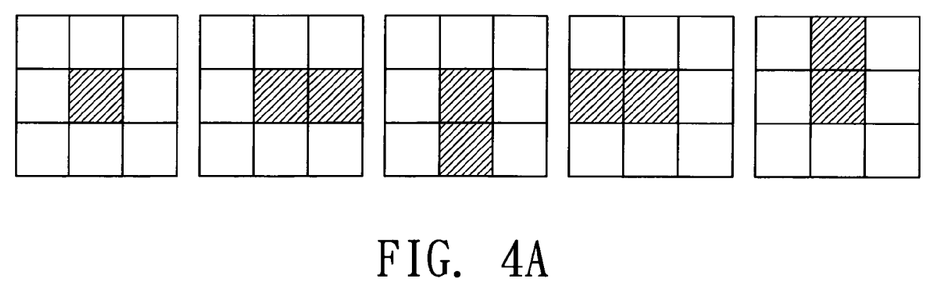
FIG. 4A illustrates a possible image distribution when the pixel E is a noise type pixel.

After the values of the criteria C1, C2, C3 and C4 are determined, the edge type of the pixel $p_{i,j}$ is determined according to the criteria C1, C2, C3 and C4. In the present embodiment of the invention, the pixel $p_{i,j}$ is categorized into noise type, angled-edge type and straight-edge type. Referring to both FIG. 1 and FIG. 4A. FIG. 4A illustrates a possible image distribution when the pixel $p_{i,j}$ is a noise type pixel. To avoid confusion, the reference numbers of the pixels in FIG. 1 are not introduced to FIG. 4A and FIG. 4B, and the pixels are referred according to their corresponding positions. In FIG. 4A, any three of the criteria C1, C2, C3 and C4 are 0, and the judgment formula is:

$$((C1\&C2\&C3)|(C1\&C2\&C4)|(C1\&C3\&C4)|(C2\&C3\&C4))=0.$$

If the result of the judgment formula equals 0, then the pixel $p_{i,j}$ is a noise. Under such circumstance, the pixel $p_{i,j}$ is more likely to be a high-frequency noise or spot than at an object edge. Consequently, the pixel $p_{i,j}$ will not be determined as an object edge, and not enhancement is applied.

Figure 4B:
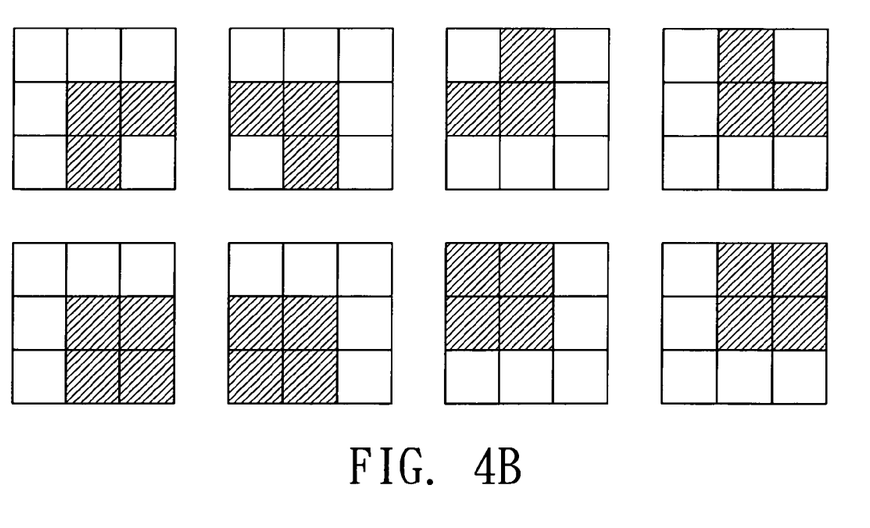
FIG. 4B illustrates a possible image distribution when the pixel E is an angled-edge type.

Referring both to FIG. 1 and FIG. 4B. FIG. 4B illustrates a possible image distribution when the pixel $p_{i,j}$ is angled-edge type. In the case of FIG. 4B, the judgment formula of the criteria C1, C2, C3 and C4 is:

$$((C1|C2)\&(C3|C4))=0.$$

Meanwhile, the pixel $p_{i,j}$ is more likely to be at an object edge of a frame, for example, at an angled-edge of the object in the frame. If the pixel $p_{i,j}$ is processed by a conventional image edge enhancement circuit, the pixel $p_{i,j}$ will be detected as an edge by both the horizontal high pass filter and the vertical high pass filter. The pixel will be enhanced twice and become over-enhanced.

If the pixel $p_{i,j}$ is neither noise type nor angled-edge type, then the pixel $p_{i,j}$ is determined as a straight-edge of an object. The pixel $p_{i,j}$ which is more likely to be at an edge of an object is only at a horizontal direction or a vertical direction. And an ordinary object edge processing is applied to the pixel $p_{i,j}$.

After the edge type of the pixel $p_{i,j}$ is obtained, the operation mode of the pixel $p_{i,j}$ is determined according to whether the first edge value H2 and the second edge value V2 are positive and the edge type of the pixel $p_{i,j}$.

If the pixel $p_{i,j}$ is noise type, then the brightness of the pixel $p_{i,j}$ is not adjusted. If the pixel $p_{i,j}$ is angled-edge type, to avoid the pixel $p_{i,j}$ being enhanced in both the horizontal direction and the vertical direction, then the operation mode of the angled-edge type pixel $P_{i,j}$ is determined according to whether the first edge value H2 and the second edge value V2 are both positive or negative. If the first edge value H2 and the second edge value V2 are both positive or both negative, then the pixel calculation value S2 is calculated as below:

$$S2=(V2+H2)/4$$

If the first edge value H2 and the second edge value V2 are not both positive or both negative, then the pixel calculation value is calculated as below:

$$S2=(V2+H2)/2$$

If the pixel $p_{i,j}$ is a straight-edge, then only the horizontal edge or the vertical edge will be detected. Therefore, one of the first edge value H2 and the second edge value V2 approximates 0. The pixel is still adjusted according to whether the first edge value H2 and the second edge value V2 are positive. However, the problem of over-enhancement will not occur, and the dividers are changed to 2 and 1, respectively. If the first edge value H2 and the second edge value V2 are both positive or both negative, then the pixel calculation value S2 is calculated as below:

$$S2=(V2+H2)/2$$

If the first edge value H2 and the second edge value V2 are not both positive or both negative, then the pixel calculation value S2 is calculated as below:

$$S2=(V2+H2)$$

Figure 5:
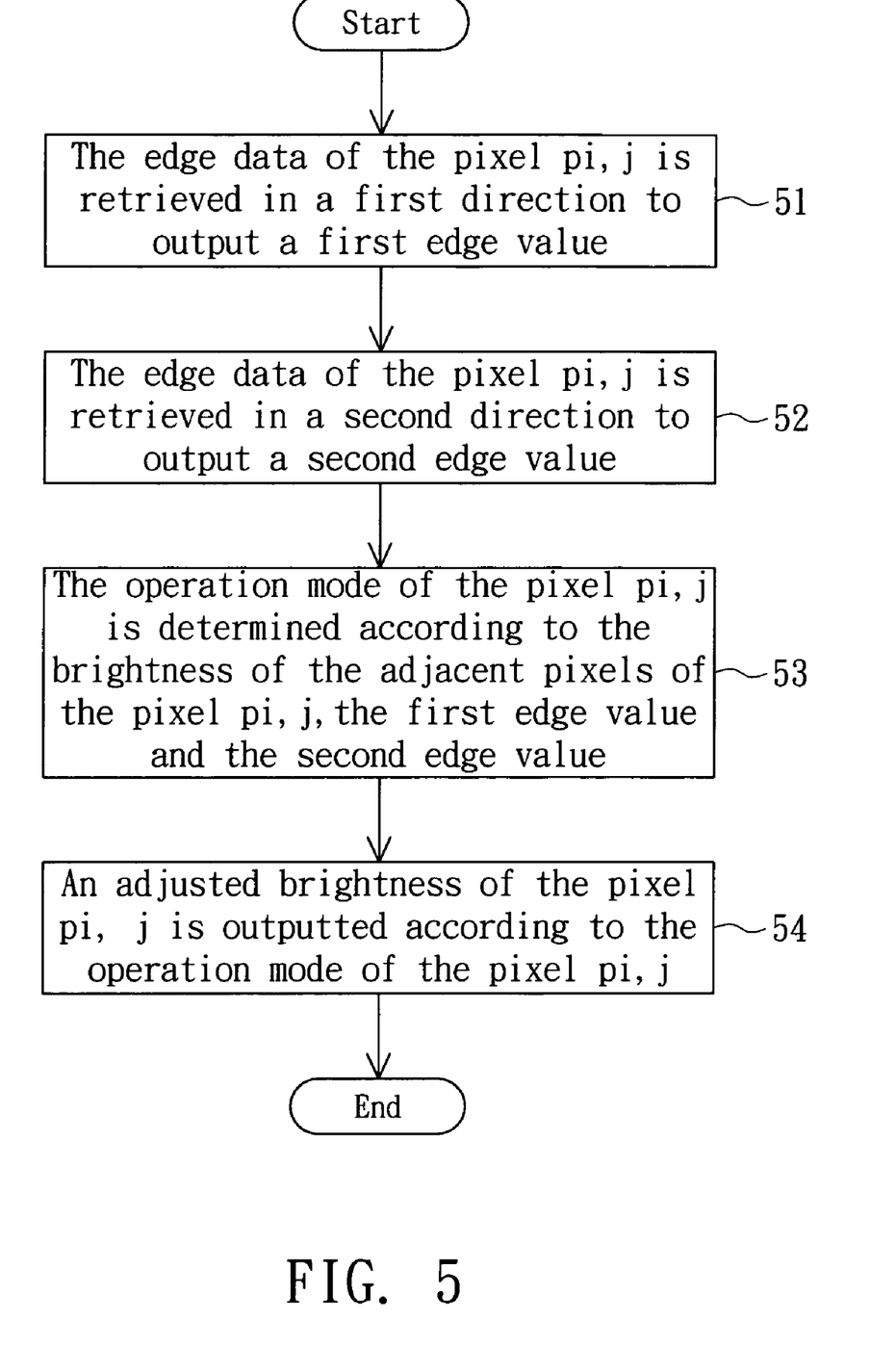
FIG. 5 illustrates a flowchart of an image edge enhancement method according to the preferred embodiment of the invention.

Referring to FIG. 5, a flowchart of an image edge enhancement method according to the preferred embodiment of the invention is shown. At first, the edge data of the pixel $p_{i,j}$ is retrieved in a first direction to output a first edge value H2. The first direction can be a horizontal direction as shown in step 51. Next, the edge data of the pixel $p_{i,j}$ is retrieved in a second direction to output a second edge value V2. The second direction can be a vertical direction as shown in step 52. Afterwards, the operation mode of the pixel $p_{i,j}$ is determined according to the brightness of the adjacent pixels around the pixel $p_{i,j}$, the first edge value H2 and the second edge value V2 as shown in step 53. At last, an adjusted brightness of the pixel $p_{i,j}$ is outputted according to the operation mode of the pixel $p_{i,j}$ as shown in step 54.

Figure 6:
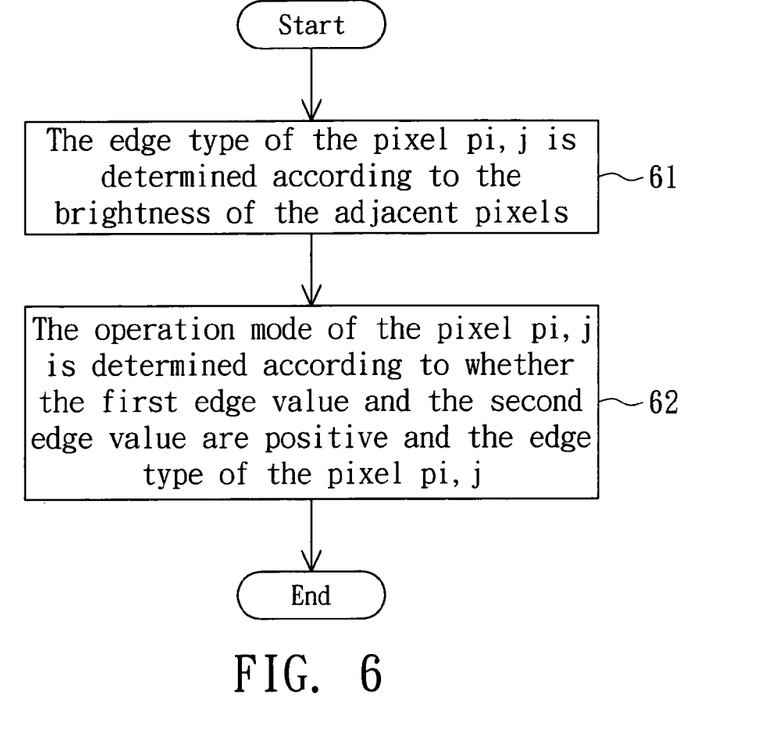
FIG. 6 illustrates step 53 of the method flowchart.

Referring to FIG. 6, a flowchart of step 53 of the method is shown. At first, the edge type of the pixel $p_{i,j}$ is determined according to the brightness of the adjacent pixels as shown in step 61. Next, the operation mode of the pixel $p_{i,j}$ is determined according to whether the first edge value H2 and the second edge value V2 are positive and the edge type of the pixel $p_{i,j}$ as shown in step 62.

Figure 7:
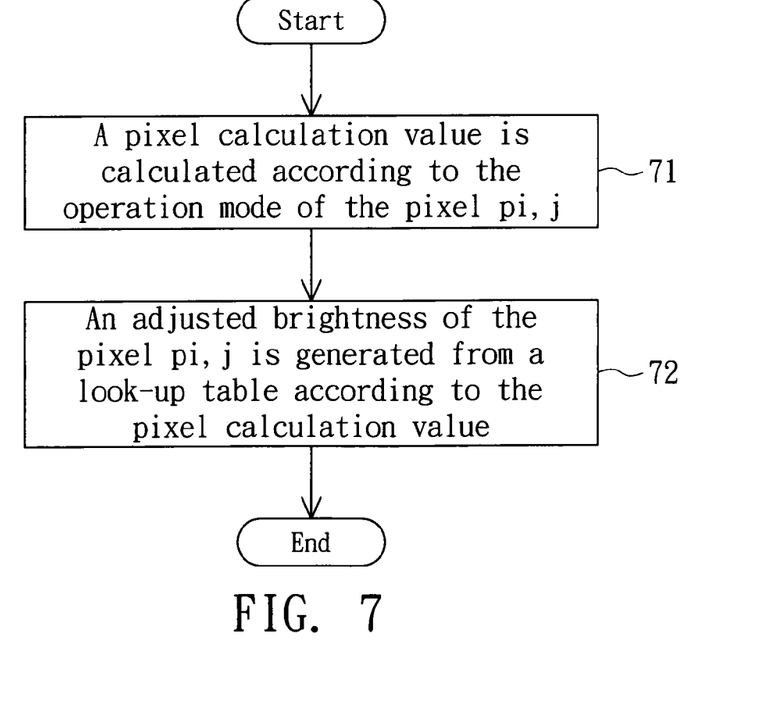
FIG. 7 illustrates step 54 of the method flowchart.

Referring to FIG. 7, a flowchart of step 54 of the method is shown. At first, a pixel calculation value is calculated according to the operation mode of the pixel $p_{i,j}$ as shown in step 71. Afterwards, an adjusted brightness of the pixel $p_{i,j}$ is generated from a predetermined look-up table (LUT) according to the pixel calculation value as shown in step 72.

According to the image edge enhancement apparatus and the method thereof disclosed in the above embodiments of the invention, the edge of an object is accurately determined, so that the edge of an object is appropriately enhanced accordingly. The invention avoids the edge of an object being over-enhanced and the spot being enhanced which occurs when the edge of an object in a frame is inaccurately filtered and misjudged.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image edge enhancement apparatus used for adjusting the brightness of a pixel $p_{i,j}$, wherein the image edge enhancement apparatus comprises:
   a first edge judgment circuit for retrieving the edge data of the pixel in a first direction to output a first edge value H2;
   a second edge judgment circuit for retrieving the edge data of the pixel in a second direction to output a second edge value V2; and
   a process circuit for determining an operation mode of the pixel according to the brightness of a plurality of adjacent pixels around the pixel, the first edge value H2 and the second edge value V2, and then outputs an adjusted brightness of the pixel according to the operation mode.

2. The image edge enhancement apparatus according to claim 1, wherein the process circuit further comprises:
   a calculation unit for determining the edge type of the pixel according to the brightness of the adjacent pixels around the pixel, and determining the operation mode according to whether the first edge value H2 and the second edge value V2 are positive and the edge type of the pixel $p_{i,j}$, and then calculating a pixel calculation value S2; and
   an inquiry unit for generating an adjusted brightness of the pixel according to the pixel calculation value S2 from a look-up table.

3. The image edge enhancement apparatus according to claim 1, wherein the image edge enhancement apparatus further comprises a plurality of register circuits for temporarily storing the brightness of the pixel $p_{i,j}$ and N adjacent pixel, the N adjacent pixels are included in the adjacent pixels.

4. The image edge enhancement apparatus according to claim 3, wherein the pixel $p_{i,j}$ has eight adjacent pixels $p_{i-1,j+1}, p_{i,j+1}, p_{i+1,j+1}, p_{i-1,j}, p_{i+1,j}, p_{i-1,j-1}, p_{i,j-1}$ and $p_{i+1,j-1}$, while the image edge enhancement apparatus further comprises six register circuits for temporarily storing the brightness of the pixel and its five adjacent pixels.

5. The image edge enhancement apparatus according to claim 4, wherein the adjacent pixels comprises a plurality of boundary pixels $p_{i,j+1}, p_{i-1,j}, p_{i,j-1}$ and $p_{i+1,j}$, and a plurality of threshold pixels $p_{i-1,j+1}, p_{i+1,j+1}, p_{i-1,j-1}$ and $p_{i+1,j-1}$, the boundary pixels $p_{i,j+1}, p_{i-1,j}, p_{i,j-1}$ and $p_{i+1,j}$ are closest to the pixel $p_{i,j}$, while the process circuit determines the edge type of the pixel $p_{i,j}$ according to the brightness of the adjacent pixels $p_{i-1,j+1}, p_{i,j+1}, p_{i+1,j+1}, p_{i-1,j}, p_{i+1,j}, p_{i-1,j-1}, p_{i,j-1}$ and $p_{i+1,j-1}$.

6. The image edge enhancement apparatus according to claim 5, wherein the process circuit determines a plurality of boundary pixel calculation values $y_{i,j+1}', y_{i-1,j}', y_{i,j-1}'$ and $y_{i+1,j}'$ according to the brightness of the boundary pixels $y_{i,j+1}, y_{i-1,j}, y_{i,j-1}$ and $y_{i+1,j}$, and the brightness of the threshold pixels $y_{i-1,j+1}, y_{i+1,j+1}, y_{i-1,j-1}$ and $y_{i+1,j-1}$, while the boundary pixel calculation values are determined according to the following formula:

$$y_{i,j+1}'=y_{i,j+1}-(y_{i-1,j+1}+y_{i+1,j+1})/2;$$

$$y_{i-1,j}'=y_{i-1,j}-(y_{i-1,j+1}+y_{i-1,j-1})/2;$$

$$y_{i,j-1}'=y_{i,j-1}-(y_{i-1,j-1}+y_{i+1,j-1})/2; \text{ and}$$

$$y_{i+1,j}'=y_{i+1,j}-(y_{i+1,j-1}+y_{i+1,j+1})/2.$$

7. The image edge enhancement apparatus according to claim 6, wherein the process circuit determines a plurality of corresponding criteria C1, C2, C3 and C4 according to the boundary pixel calculation values $y_{i,j+1}', y_{i-1,j}', y_{i,j-1}'$ and $y_{i+1,j}'$, and a predetermined threshold value Th, wherein the criteria are determined according to the following judgment formula:

when $y_{i,j+1}'<Th$, C1=1;

when $y_{i,j+1}'>Th$, C1=0;

when $y_{i-1,j}'<Th$, C2=1;

when $y_{i-1,j}'>Th$, C2=0;

when $y_{i,j-1}'<Th$, C3=1;

when $y_{i,j-1}'>Th$, C3=0;

when $y_{i+1,j}'<Th$, C4=1; and when $y_{i+1,j}'>Th$, C4=0.

8. The image edge enhancement apparatus according to claim 7, wherein the process circuit determines the edge type of the pixel $p_{i,j}$ according to the criteria C1, C2, C3 and C4, while the edge type of the pixel $p_{i,j}$ is determined according to the following judgment formula:

when $((C1\&C2\&C3)|(C1\&C2\&C4)|(C1\&C3\&C4)|(C2\&C3\&C4))=0$, the edge type of the pixel $p_{i,j}$ is noise type;

when $((C1|C2)\&(C3|C4))=0$, the edge type of the pixel $p_{i,j}$ is angled-edge type; and when $((C1\&C2\&C3)|(C1\&C2\&C4)|(C1\&C3\&C4)|(C2\&C3\&C4))=0$ and $((C1|C2)\&(C3|C4))=0$ do not hold true, the edge type of the pixel $p_{i,j}$ is straight-edge type.

9. The image edge enhancement apparatus according to claim 8, wherein when the edge type of the pixel $p_{i,j}$ is angled-edge type, and when the first edge value H2 and the second edge value V2 are both positive or both negative, then the pixel calculation value S2=(V2+H2)/4.

10. The image edge enhancement apparatus according to claim 8, wherein when the edge type of the pixel $p_{i,j}$ is angled-edge type, and when the first edge value H2 and the second edge value V2 are not both positive or both negative, then the pixel calculation value S2=(V2+H2)/2.

11. The image edge enhancement apparatus according to claim 8, wherein when the edge type of the pixel $p_{i,j}$ is straight-edge type, and when the first edge value H2 and the second edge value V2 are both positive or both negative, then the pixel calculation value S2=(V2+H2)/2.

12. The image edge enhancement apparatus according to claim 8, wherein when the edge type of the pixel $p_{i,j}$ is straight-edge type, and when the first edge value H2 and the second edge value V2 are not both positive or both negative, then the pixel calculation value S2=(V2+H2).

13. The image edge enhancement apparatus according to claim 1, wherein the edge enhancement is performed in a Y color gamut.

14. The image edge enhancement apparatus according to claim 1, wherein the first edge judgment circuit and the second edge judgment circuit are a high-pass finite impulse response filter (HP FIR filter).

15. The image edge enhancement apparatus according to claim 1, wherein the first direction is a horizontal direction, while the second direction is a vertical direction.

16. An image edge enhancement method, comprising the steps of:
retrieving the edge data of a pixel $p_{i,j}$ in a first direction to output a first edge value H2;
retrieving the edge data of the pixel $p_{i,j}$ in a second direction to output a second edge value V2;
determining an operation mode of the pixel according to the brightness of a plurality of adjacent pixels around the pixel $p_{i,j}$ by the first edge value H2 and the second edge value V2; and
outputting an adjusted brightness of the pixel according to the operation mode.

17. The image edge enhancement method according to claim 16, wherein the step of determining the operation mode of the pixel $p_{i,j}$ comprises:
determining the edge type of the pixel $p_{i,j}$ according to the brightness of the adjacent pixels; and
determining the operation mode of the pixel according to whether the first edge value H2, the second edge value V2 are positive and the edge type of the pixel $p_{i,j}$.

18. The image edge enhancement method according to claim 17, wherein the step of outputting an adjusted brightness of the pixel $p_{i,j}$ according to the operation mode comprises:
calculating a pixel calculation value S2 according to the operation mode; and
generating an adjusted brightness of the pixel $p_{i,j}$ according to the pixel calculation value S2 from a look-up table.

19. The image edge enhancement method according to claim 18, wherein the pixel $p_{i,j}$ has a plurality of adjacent pixels $p_{i-1,j+1}$, $p_{i,j+1}$, $p_{i+1,j+1}$, $p_{i-1,j}$, $p_{i+1,j}$, $p_{i-1,j-1}$, $p_{i,j-1}$ and $p_{i+1,j-1}$, the adjacent pixels comprise a plurality of boundary pixels $p_{i,j+1}$, $p_{i-1,j}$, $p_{i,j-1}$ and $p_{i+1,j}$, and a plurality of threshold pixels $p_{i-1,j+1}$, $p_{i+1,j+1}$, $p_{i-1,j-1}$ and $p_{i+1,j-1}$, while the boundary pixels $p_{i,j+1}$, $p_{i-1,j}$, $p_{i,j-1}$ and $p_{i+1,j}$ are closest to the pixel $p_{i,j}$.

20. The image edge enhancement method according to claim 19, wherein the step of determining the operation mode of the pixel $p_{i,j}$ further comprises:
determining a plurality of boundary pixel calculation values $y_{i,j+1}'$, $y_{i-1,j}'$, $y_{i,j-1}'$ and $y_{i+1,j}'$ according to the brightness of the boundary pixels $y_{i,j+1}$, $y_{i-1,j}$, $y_{i,j-1}$ and $y_{i+1,j}$ and the brightness of the threshold pixels $y_{i-1,j+1}$, $y_{i+1,j+1}$, $y_{i-1,j-1}$ and $y_{i+1,j-1}$, and determining the boundary pixel calculation values according to the following formula:

$$y_{i,j+1}'=y_{i,j+1}-(y_{i-1,j+1}+y_{i+1,j+1})/2;$$

$$y_{i-1,j}'=y_{i-1,j}-(y_{i-1,j+1}+y_{i-1,j-1})/2;$$

$$y_{i,j-1}'=y_{i,j-1}-(y_{i-1,j-1}+y_{i+1,j-1})/2; \text{ and}$$

$$y_{i+1,j}'=y_{i+1,j}-(y_{i+1,j-1}+y_{i+1,j+1})/2.$$

21. The image edge enhancement method according to claim 20, wherein the step of determining the operation mode of the pixel $p_{i,j}$ further comprises:
determining a plurality of corresponding criteria C1, C2, C3 and C4 according to the boundary pixel calculation values $y_{i,j+1}'$, $y_{i-1,j}'$, $y_{i,j-1}'$ and $y_{i+1,j}'$ and a predetermined threshold value Th, wherein the criteria are determined according to the following judgment formula:

when $y_{i,j+1}'<Th$, C1=1;

when $y_{i,j+1}'>Th$, C1=0;

when $y_{i-1,j}'<Th$, C2=1;

when $y_{i-1,j}'>Th$, C2=0;

when $y_{i,j-1}'<Th$, C3=1;

when $y_{i,j-1}'>Th$, C3=0;

when $y_{i+1,j}'<Th$, C4=1; and when $y_{i+1,j}'>Th$, C4=0.

22. The image edge enhancement method according to claim 21, wherein in the step of determining the operation mode of the pixel $p_{i,j}$, the edge type of the pixel $p_{i,j}$ is determined according to the following judgment formula:

when $((C1\&C2\&C3)|(C1\&C2\&C4)|(C1\&C3\&C4)|(C2\&C3\&C4))=0$, the edge type of the pixel $p_{i,j}$ is noise type;

when $((C1|C2)\&(C3|C4))=0$, the edge type of the pixel $p_{i,j}$ is angled-edge type; and when $((C1\&C2\&C3)|(C1\&C2\&C4)|(C1\&C3\&C4)|(C2\&C3\&C4))=0$ and $((C1|C2)\&(C3|C4))=0$ do not hold true, the edge type of the pixel $p_{i,j}$ is straight-edge type.

23. The image edge enhancement method according to claim 22, wherein when the edge type of the pixel $p_{i,j}$ is angled-edge type, and when the first edge value H2 and the second edge value V2 are both positive or both negative, then the pixel calculation value S2=(V2+H2)/4.

24. The image edge enhancement method according to claim 22, wherein when the edge type of the pixel $p_{i,j}$ is angled-edge type, and when the first edge value H2 and the second edge value V2 are not both positive or both negative, then the pixel calculation value S2=(V2+H2)/2.

25. The image edge enhancement method according to claim 22, wherein when the edge type of the pixel $p_{i,j}$ is straight-edge type, and when the first edge value H2 and the second edge value V2 are both positive or both negative, then the pixel calculation value S2=(V2+H2)/2.

26. The image edge enhancement method according to claim 22, wherein when the edge type of the pixel $p_{i,j}$ is straight-edge type, and when the first edge value H2 and the second edge value V2 are not both positive or both negative, then the pixel calculation value S2=(V2+H2).

27. The image edge enhancement method according to claim 16, wherein the edge enhancement is performed in a Y color gamut.

28. The image edge enhancement method according to claim 16, wherein the first direction is a horizontal direction, while the second direction is a vertical direction.

* * * * *

UNITED STATES PATENT AND TRADEMARK OFFICE
CERTIFICATE OF CORRECTION

PATENT NO.      : 7,657,115 B2
APPLICATION NO. : 11/450454
DATED           : February 2, 2010
INVENTOR(S)     : Te-Yi Chen Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 905 days.

Signed and Sealed this

Thirtieth Day of November, 2010

David J. Kappos
*Director of the United States Patent and Trademark Office*